(12) United States Patent
Hebert et al.

(10) Patent No.: US 11,745,468 B2
(45) Date of Patent: Sep. 5, 2023

(54) PROTECTION FILM

(71) Applicant: 3M INNOVATIVE PROPERTIES COMPANY, St. Paul, MN (US)

(72) Inventors: Larry S. Hebert, Hudson, WI (US); Scott A. Boyd, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 560 days.

(21) Appl. No.: 16/323,486

(22) PCT Filed: Sep. 25, 2017

(86) PCT No.: PCT/US2017/053202
§ 371 (c)(1),
(2) Date: Feb. 5, 2019

(87) PCT Pub. No.: WO2018/063970
PCT Pub. Date: Apr. 5, 2018

(65) Prior Publication Data
US 2021/0283883 A1   Sep. 16, 2021

Related U.S. Application Data

(60) Provisional application No. 62/400,329, filed on Sep. 27, 2016.

(51) Int. Cl.
*B32B 15/14* (2006.01)
*B32B 5/26* (2006.01)
(Continued)

(52) U.S. Cl.
CPC .............. *B32B 15/14* (2013.01); *B32B 5/022* (2013.01); *B32B 5/024* (2013.01); *B32B 5/18* (2013.01);
(Continued)

(58) Field of Classification Search
CPC ......... B32B 15/14; B32B 5/275; B32B 5/022; B32B 5/245; B32B 5/024; B32B 5/18;
(Continued)

(56) References Cited

U.S. PATENT DOCUMENTS 3,403,862 A   10/1968   Dworjanyn
3,485,706 A   12/1969   Evans
(Continued)

FOREIGN PATENT DOCUMENTS

CA   2084626   10/2000
CA   2878968   11/2016
(Continued)

OTHER PUBLICATIONS

International Search Report for PCT International Application No. PCT/US2017/053202, dated Jan. 11, 2018, 5 pages.

*Primary Examiner* — Elizabeth M Imani
(74) *Attorney, Agent, or Firm* — Philip P. Soo

(57) ABSTRACT

Provided is a protection film including a plurality of layers, including a first carrier layer having a plurality of electrically conductive fibers; a metal layer; and a second carrier layer having a plurality of electrically conductive fibers. Each of the first and second carrier layers has a void volume at least partially filled with a hardenable composition. Also provided is a protection film including a first metal layer, a carrier layer, and a second metal layer, in which the carrier layer is at least partially filled with a hardenable composition. These films can provide lightning strike protection with suitable tensile, rigidity and tack properties for automatic tape layup and automatic fiber placement applications.

15 Claims, 2 Drawing Sheets

(51) Int. Cl.
*B32B 5/02* (2006.01)
*B32B 5/18* (2006.01)
*B32B 5/24* (2006.01)
*C08K 3/08* (2006.01)
*C08K 3/04* (2006.01)

(52) U.S. Cl.
CPC .............. *B32B 5/245* (2013.01); *B32B 5/275* (2021.05); *C08K 3/08* (2013.01); *B32B 2250/40* (2013.01); *B32B 2260/023* (2013.01); *B32B 2260/046* (2013.01); *B32B 2262/0261* (2013.01); *B32B 2262/0276* (2013.01); *B32B 2262/101* (2013.01); *B32B 2262/106* (2013.01); *B32B 2266/045* (2013.01); *B32B 2307/202* (2013.01); *B32B 2605/18* (2013.01); *C08K 3/04* (2013.01); *C08K 2003/085* (2013.01); *C08K 2003/0862* (2013.01)

(58) Field of Classification Search
CPC .... B32B 2262/0276; B32B 2262/0261; B32B 2307/202; B32B 2605/18; B32B 2260/046; B32B 2250/40; B32B 2266/045; B32B 2262/101; B32B 2262/106; B32B 2260/023; C08K 3/08; C08K 2003/085; C08K 2003/0862; C08K 3/04

See application file for complete search history.

(56) References Cited

U.S. PATENT DOCUMENTS

| | | | |
|---|---|---|---|
| 3,700,521 A | 10/1972 | Gaffney | |
| 3,723,218 A | 3/1973 | Gaffney | |
| 3,767,353 A | 10/1973 | Gaffney | |
| 4,123,491 A | 10/1978 | Larsen | |
| 4,755,904 A | 7/1988 | Brick | |
| 4,839,771 A | 6/1989 | Covey | |
| 5,127,601 A | 7/1992 | Schroeder | |
| 5,225,265 A | 7/1993 | Prandy | |
| 5,370,921 A * | 12/1994 | Cedarleaf | B32B 15/14 428/138 |
| 5,417,385 A * | 5/1995 | Arnold | B32B 5/12 244/1 A |
| 5,650,215 A | 7/1997 | Mazurek | |
| 6,086,975 A | 7/2000 | Brick | |
| 6,303,206 B1 | 10/2001 | Brick | |
| 6,432,507 B1 | 8/2002 | Brick | |
| 8,206,823 B2 | 6/2012 | Schaaf | |
| 8,709,188 B2 | 4/2014 | Rocker | |
| 8,709,189 B2 | 4/2014 | Schaaf | |
| 8,922,970 B2 | 12/2014 | Hebert | |
| 10,005,268 B2 | 6/2018 | Jeltsch | |
| 2002/0180077 A1 * | 12/2002 | Glatkowski | H05K 9/009 264/36.1 |
| 2004/0246651 A1 * | 12/2004 | De La Fuente De Ana | B64D 45/02 361/215 |
| 2007/0141927 A1 | 6/2007 | Brown | |
| 2009/0258220 A1 | 10/2009 | Schaaf | |
| 2009/0269596 A1 | 10/2009 | Rocker | |
| 2010/0103582 A1 | 4/2010 | Shimp | |
| 2010/0141214 A1 | 6/2010 | Cawse | |
| 2010/0147546 A1 * | 6/2010 | Mull | H02G 13/00 29/6.1 |
| 2010/0151214 A1 | 6/2010 | Cawse | |
| 2011/0014356 A1 * | 1/2011 | Fornes | C08G 59/58 324/72 |
| 2011/0159764 A1 | 6/2011 | Price | |
| 2011/0165403 A1 | 7/2011 | Lefebure | |
| 2011/0174522 A1 | 7/2011 | Simmons | |
| 2011/0294387 A1 | 12/2011 | Simmons et al. | |
| 2012/0063050 A1 | 3/2012 | Langone | |
| 2012/0138609 A1 | 6/2012 | Gerken | |
| 2012/0145319 A1 | 6/2012 | Schaaf | |
| 2012/0171477 A1 | 7/2012 | Snag | |
| 2012/0219745 A1 | 8/2012 | Fisset | |
| 2012/0219775 A1 | 8/2012 | Fisset | |
| 2013/0009001 A1 | 1/2013 | Gerken | |
| 2013/0048331 A1 * | 2/2013 | Fornes | B64D 45/02 174/2 |
| 2013/0118770 A1 | 5/2013 | De Jong | |
| 2014/0110633 A1 | 4/2014 | Pratte | |
| 2016/0347918 A1 * | 12/2016 | Le | B29C 70/30 |

FOREIGN PATENT DOCUMENTS

| | | |
|---|---|---|
| DE | 102011105377 | 1/2012 |
| DE | 102011109698 | 2/2013 |
| DE | 102013210034 | 12/2014 |
| EP | 0318839 | 6/1989 |
| EP | 0248122 | 7/1992 |
| EP | 0976653 | 2/2000 |
| EP | 0768167 | 9/2000 |
| EP | 2162718 | 1/2002 |
| EP | 2591911 | 5/2013 |
| EP | 2432634 | 12/2013 |
| EP | 2687364 | 1/2014 |
| EP | 2496411 | 6/2016 |
| EP | 2285562 | 8/2016 |
| EP | 2743064 | 9/2016 |
| EP | 2046570 | 9/2018 |
| FR | 2961514 | 12/2011 |
| GB | 2433467 | 9/2008 |
| GB | 201010445 | 8/2010 |
| GB | 2474897 | 5/2011 |
| GB | 2475041 | 5/2011 |
| GB | 2503864 | 9/2014 |
| GB | 2481528 | 1/2017 |
| JP | 2012-082394 A2 | 4/2012 |
| WO | WO 2008-015082 | 2/2008 |
| WO | WO 2009-128991 | 10/2009 |
| WO | WO 2010-010084 | 1/2010 |
| WO | WO 2010-035021 | 4/2010 |
| WO | WO 2010-135318 | 11/2010 |
| WO | WO 2011-051697 | 5/2011 |
| WO | WO 2011-051698 | 5/2011 |
| WO | WO 2011-075344 | 6/2011 |
| WO | WO 2012-074639 | 6/2012 |
| WO | WO 2013-041712 | 3/2013 |
| WO | WO 2014-057960 | 4/2014 |
| WO | WO 2014/088866 | 6/2014 |
| WO | WO 2015/0112532 | 7/2015 |
| WO | WO 2017-091365 | 6/2017 |

* cited by examiner

PROTECTION FILM

CROSS REFERENCE TO RELATED APPLICATIONS

This application is a national stage filing under 35 U.S.C. 371 of PCT/US2017/053202, filed Sep. 25, 2017, which claims the benefit of U.S. Provisional Patent Application No. 62/400,329, filed Sep. 27, 2016, the disclosures of which are incorporated by reference in their entirety herein.

FIELD OF THE INVENTION

Provided are protection films, and more particularly, protection films capable of being disposed on the exterior aircraft surfaces.

BACKGROUND

The problem of lightning strikes in modern aircraft is significant. Even as pilots are trained to avoid flying through storms, lightning nonetheless strikes U.S. commercial aircraft more than once per year on average. Lightning traveling along the exterior skin of an aircraft can induce transients in wires or equipment beneath the skin. If not mitigated, these transients can cause malfunction in computers and flight instruments. Even worse, a lightning strike can even ignite fuel or other flammables on board the aircraft.

In conventional aircraft, the effects of lightning can be mitigated by ensuring continuity across the exterior surfaces of the aircraft. Since the outer skin of most airplanes is generally made from aluminum, a good electrical conductor, electrical current can be diverted along the skin without interruption or diversion to the interior of the aircraft.

Protection against lightning strikes is more challenging for aircraft that use exterior panels made of advanced composites instead of metal. Composite materials are useful because of their lighter weight, but do not conduct as well as aluminum. A further issue in modern aircraft is the use of more elaborate electronic systems that are more susceptible than mechanical systems to the electromagnetic disturbances induced by lightning. Today, airplanes receive a rigorous set of lightning certification tests to verify the safety of their designs. Lightning strikes can also cause damage to earth-bound objects. As wind generators, automobiles, buses, and trucks begin to use greater amounts of non-conductive composites, solutions for lightning strike protection become increasingly relevant.

SUMMARY

Lightning strike protection films generally incorporate one or more electrical conductors that safely divert electrical current along the skin of the aircraft while shielding interior components of the aircraft from effects of the current. Electrically conductive layers include metallized woven fabric, metalized paper, solid metal films, foraminous (i.e., porous) metal films, metal wires, metal mesh, metal particles, expanded metal foils, carbon particles or carbon fibers.

Lightning strike protection films often need to have high tensile strength and modulus in the pre-cured state, when airplane manufacturers use automatic tape layup ("ATL") and automatic fiber placement ("AFP") machines. The current hand applied method does not require film with high tensile strength or modulus.

The addition of unidirectional fibers increases the tensile properties and rigidity of lightning strike films which are capable of being applied using either ATL or AFP without distorting the unsupported film. The drawback of adding these layers is the tendency to isolate the expanded copper foil conductor layers in overlaps, thus increasing damage to the composite and increasing the conducted currents on internal aircraft systems in the event of a lightning strike.

The provided protection films use an electrical conductor, such as an expanded copper foil, in combination of one or more carrier layers to provide strength. Suitable conductors, on their own, may have sufficient tensile strength for hand application, but tend to deform and stretch in unsupported areas of the ATL or AFP machines. These carrier layers alleviate the problem by stiffening and strengthening films constructed with these conductors. The choice of fiber and fiber density can be advantageously tailored to meet the requirements specific to each type of application. As a further advantage, the provided protection films can display electrical conductivity along the z-axis direction, which can significantly enhance the capacity for electrical current flow across the surface of the protection films.

In a first aspect, a protection film is provided. The protection film comprises a plurality of layers, in the following order: a first carrier layer comprising a plurality of electrically conductive fibers; a metal layer; and a second carrier layer comprising a plurality of electrically conductive fibers, wherein each of the first and second carrier layers has a void volume at least partially filled with a hardenable composition.

In a second aspect, a protection film is provided comprising a plurality of layers, in the following order: a first metal layer; a carrier layer; and a second metal layer, wherein the carrier layer is at least partially filled with a hardenable composition.

In a third aspect, a prepreg article is provided, comprising an aforementioned protection film disposed on a carbon fiber composite or glass fiber composite prior to bonding or curing.

DEFINITIONS

Figure 1:
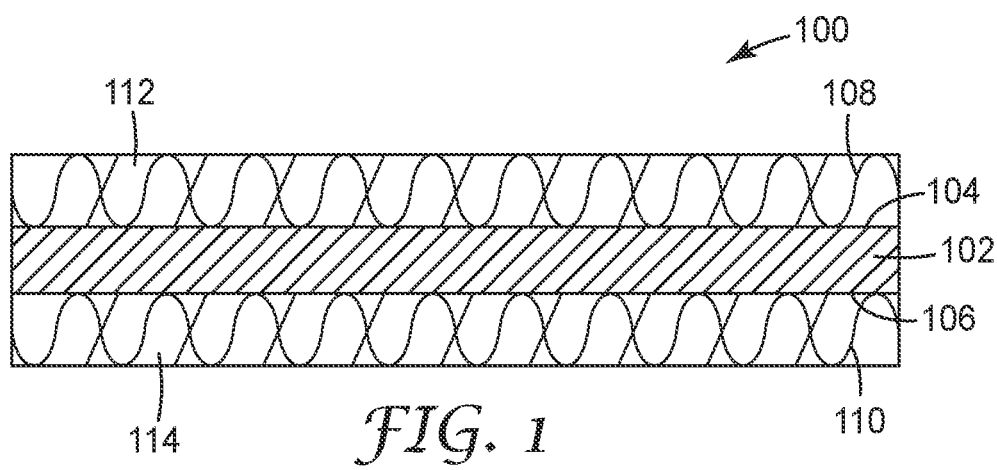
FIGS. 1-5 are cross-sectional views of protection films according to various exemplary embodiments.

As used herein:

"nonwoven" refers to a textile structure produced by bonding or interlocking of fibers, or both, accomplished by mechanical, chemical, thermal, or solvent means and combinations thereof;

"woven" refers to a structure produced when at least two sets of strands are interlaced, usually at right angles to each other, according to a predetermined pattern of interlacing, and such that at least one set is parallel to the axis along the lengthwise direction of the fabric; and "z-axis" refers to a direction oriented perpendicular to the plane of the protection film.

DETAILED DESCRIPTION

Provided herein is a disclosure of protection films that may be used to protect composite aircraft surfaces from lightning strikes, along with methods and articles related to these protection films. These show, through illustration and example, useful constructions of these protection films, but are not intended to be exhaustive or unduly limit the claimed invention.

Repeated use of reference characters in the specification and drawings is intended to represent the same or analogous features or elements of the disclosure. It is to be understood that numerous other modifications and embodiments can be devised by those skilled in the art, which fall within the scope and spirit of the principles of the disclosure.

The drawings, referred to herein, may not be to scale.

Film Constructions, Generally

An exemplary protection film is shown in FIG. 1 and herein designated by the numeral 100. The protection film 100 is multilayered and includes an electrical conductor 102 having opposed first and second major surfaces 104, 106. The conductor 102 is disposed between first and second carrier layers 112, 114. In select embodiments, the first and second carrier layers 112, 114 are fibrous. As shown here, the first and second carrier layers 112, 114 are each comprised of a woven material.

Each of the first and second carrier layers 112, 114 have void volumes at least partially filled with respective hardenable compositions. Such compositions can be hardened, for example, by a chemical cure process, the addition of heat, exposure to actinic radiation, or some combination thereof. In preferred embodiments, the hardenable compositions are curable thermoset compositions.

In preferred embodiments, the first and second carrier layers 112, 114 have void volumes that are at least partially filled with first and second curable thermoset compositions 108, 110, respectively. Each of the first and second carrier layers 112, 114 can have, for example, at least 50 percent, at least 60 percent, at least 70 percent, at least 80 percent, at least 90 percent, at least 95 percent, or essentially all, of its void volume filled with curable thermoset composition 108, 110. The first and second curable thermoset compositions 108, 110, as described in a later subsection, may have the same composition or different compositions.

If the conductor 102 is foraminous, the first and/or second curable thermoset compositions 108, 110 may partially or fully fill the void volume present in the conductor 102. In these instances, the volume percentages listed above with respect to the loading of the carrier layer 112, 114 with the first and/or second curable thermoset compositions 108, 110 are similarly applicable to the loading of the conductor 102.

In preferred embodiments, the first and second curable thermoset compositions 108, 110 are dimensionally stable and have the properties of a pressure-sensitive adhesive. This allows the protection film 100 to have sufficient tack to be adhered to a surface prior to such time that the first and second curable thermoset compositions 108, 110 are hardened.

Optionally and as shown, the curable thermoset compositions 108, 110 directly and continuously contact the respective first and second major surfaces 104, 106 of the conductor 102. In some embodiments, the protection film 100 displays planar symmetry about the conductor 102—for instance, the first and second carrier layers 112, 114 can have substantially the same composition, structure and dimensions. Advantageously, should the protection film 100 be used as a prepreg, this symmetry can facilitate uniform mechanical properties when laying up the protection film 100 against concave and convex molding surfaces.

Additionally, either or both of the first and second carrier layers 112, 114 may directly contact the conductor 102 concurrently with the curable thermoset compositions 108, 110. Similarly, either or both of the first and second carrier layers 112, 114 may be partially exposed along the outward-facing surface(s) of the curable thermoset composition 108. As will be further articulated, the fibers in the first and second fibrous layers 112, 114 can be made electrically conductive to enable conductivity of the protection film 100 along the z-axis direction.

Figure 2:
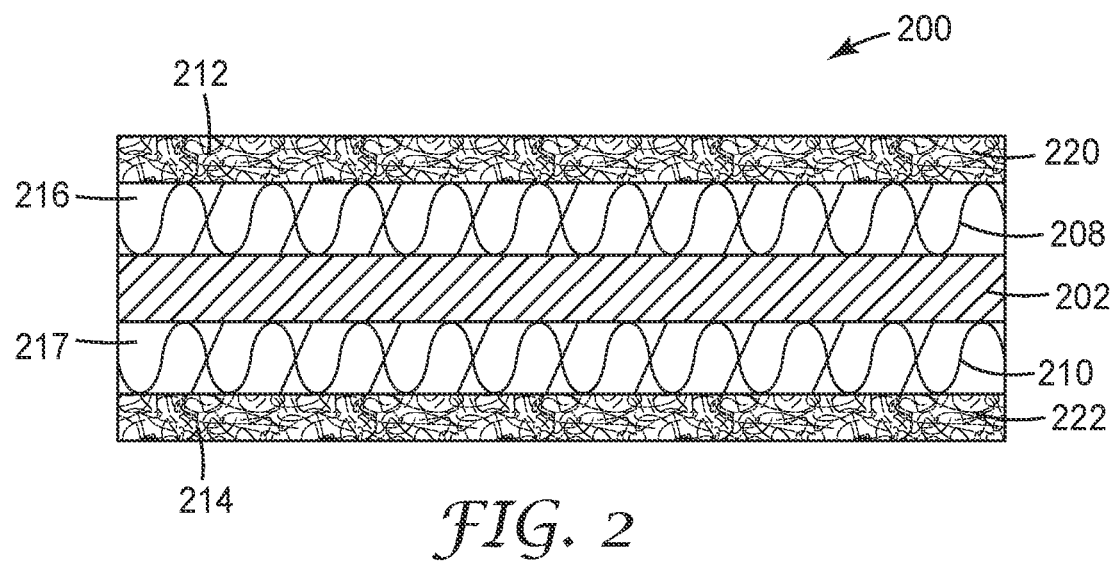

FIG. 2 shows a protection film 200 in which a conductor 202 is disposed between first and second carrier layers 112, 114 made from a woven material, and a pair of nonwoven carrier layers 220, 222 are disposed on the outer surfaces of the first and second carrier layers 112, 114, respectively. In FIG. 2, the first and second carrier layers 112, 114 and the first and second nonwoven carrier layers 220, 222 are concentric and symmetrically disposed about the conductor 202.

Figure 3:
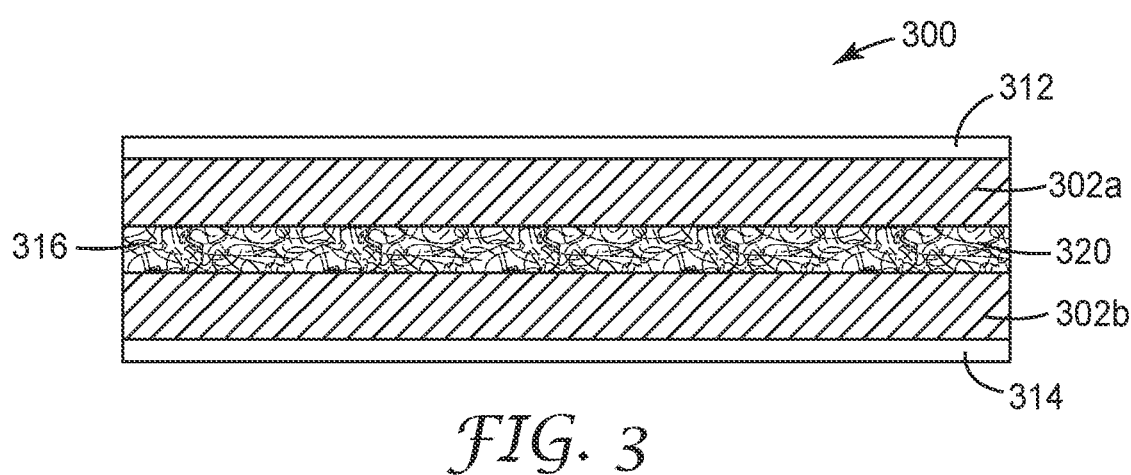

FIG. 3 depicts a protection film 300 having a modified layer configuration where the conductive layer is located proximal to the outward-facing surfaces of the protection film. As shown, the protection film 300 has a pair of electrical conductors 302a, 302b separated by a single, nonwoven carrier layer 320.

Like the carrier layers in the previous embodiments, the nonwoven carrier layer 320 is at least partially filled with a curable thermoset composition 316. The nonwoven carrier layer 320 could have at least 50 percent, at least 60 percent, at least 70 percent, at least 80 percent, at least 90 percent, at least 95 percent, or essentially all, of its void volume filled with curable thermoset composition 108, 110.

The nonwoven carrier layer 320 and the curable thermoset composition 316, as shown, extend across and contact the adjacent conductors 302a, 302b. Optionally and as shown, a relatively thin layer of first and second curable thermoset compositions 312, 314 are located on the outward-facing surfaces of the conductors 302a, 302b.

Further aspects of the protection film 300 are analogous to those described already with respect to protection film 100 and will not be repeated here.

Figure 4:
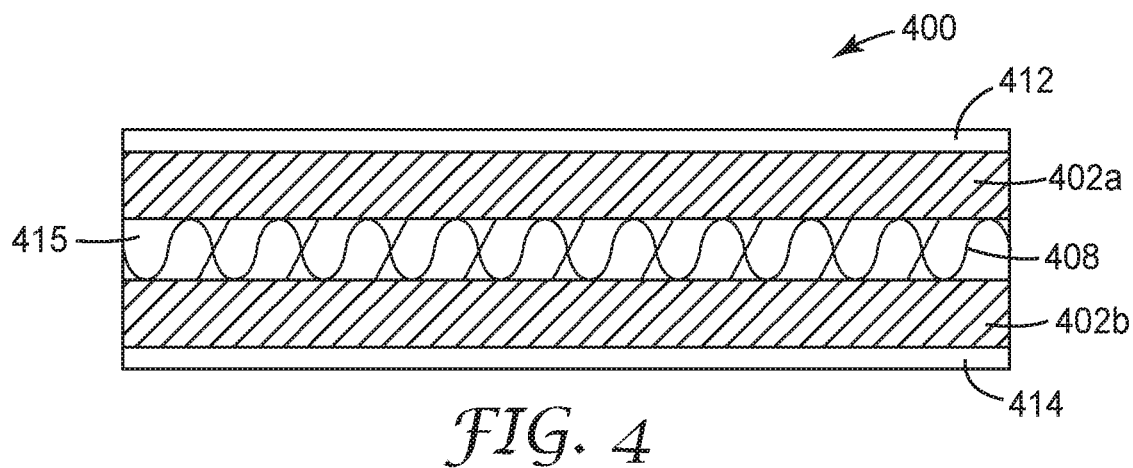

FIG. 4 shows yet another protection film 400 similar in many respects to the protection film 300. Like the previous embodiment, the protection film 400 includes a pair of conductors 402a, 402b located between surface layers of curable thermoset compositions 412, 414. Instead of a nonwoven carrier layer, the protection film 400 uses a woven carrier layer 408, centrally located between the conductors 402a, 402b.

Figure 5:
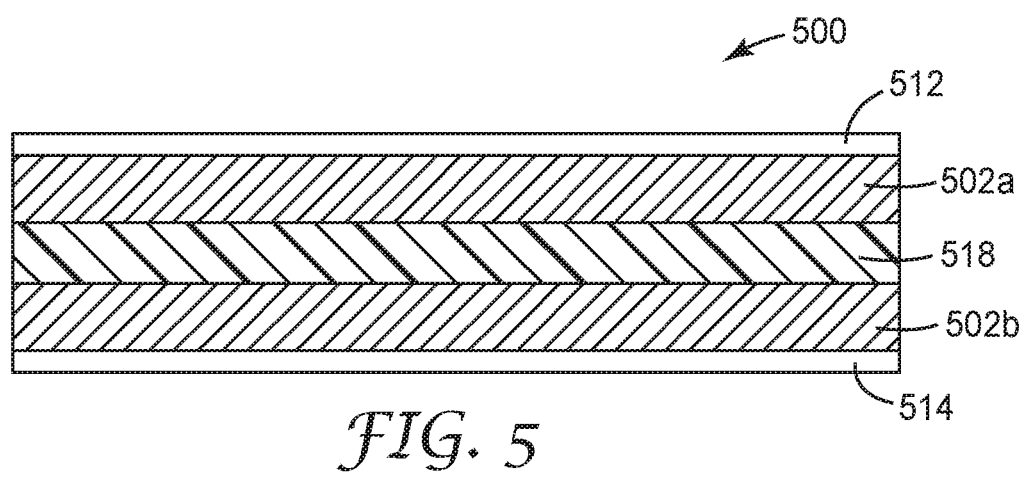

FIG. 5 shows yet another protection film 500 analogous to protection films 300, 400 where the central layer is a thermoplastic carrier layer 518. The thermoplastic carrier layer 518 is sandwiched between conductors 502a, 502b. Optionally, the thermoplastic carrier layer 518 is directly laminated to the conductors 502a, 502b.

Advantageously, the provided protection films can have sufficient stiffness to be used in an ATL or ATP manufacturing machine. ATL and ATP machines generally use a web handling process in which significant areas of the protection film is not mechanically supported. As a result, cutting, feeding, and even gravity alone can induce undue distortion of conventional films used in such machines, resulting in visual surface defects, film damage, and other quality issues.

To enable use of an ATL or ATP manufacturing process, the provided protection films can be characterized by a higher degree of flexural rigidity than those of conventional protection films. Flexural rigidity is defined as the out-of-plane orientation as $f(EI)/\omega$, where $f(EI)$ is the sum of the products of E, the Young's modulus, and I, the second moment of area, of each region in the cross section of the film, and $\omega$ is the basis weight of the film. In preferred embodiments, the provided protection films display a flexural rigidity of at least 0.002 m³/m, at least 0.003 m³/m, or at least 0.004 m³/m, under ambient conditions.

Specifics concerning discrete components of these protection films—particularly the conductor, carrier layers, and curable thermoset composition—are provided in the subsections below.

Conductors

As noted above, the provided protection films include one or more conductors. The conductor can may be made of any suitable electrically conductive material, typically a metal. As an example, the conductor may be a metal foil that is sufficiently thin to allow the protection film to flex and conform to non-planar surfaces.

Typically the conductor is comprised of a material having a favorable balance of properties including high electrical conductivity, low density and high resistance to corrosion. Useful metals include, without limitation, copper, aluminum, nickel, zinc, silver, gold, as well as metal alloys thereof.

The preferred dimensions of the conductor should preferably balance both the need for high conductivity and conformability. In some embodiments, the conductor can have an overall thickness of at least 2 micrometers, at least 3 micrometers, at least 4 micrometers, or at least 5 micrometers. The conductor can have an overall thickness of up to 50 micrometers, up to 40 micrometers, up to 30 micrometers, up to 20 micrometers, or up to 12 micrometers.

In some embodiments, the conductor includes a unitary expanded metal foil. The expanded metal foil can include a plurality of voids having the general shape of a parallelogram, e.g., diamond-shaped or square, with a major axis acutely angled with respect to the down-web direction of the conductor (neither parallel to nor perpendicular to the down-web direction of the conductor) and a minor axis also acutely angled with respect to the down-web direction of the conductor. The voids are bounded by linear strands, which are oriented generally parallel to the down-web direction of the conductor, and cross strands oriented diagonal to or perpendicular to the down-web direction of the conductor. The linear strands and cross strands meet at nodes.

The linear strands are substantially parallel to the down-web direction. In this disclosure, "parallel to the down-web direction" refers to orientation in the general plane of the film or mesh and disregards the out-of-plane, or z-axis, orientation. In some embodiments, the linear strands are parallel to the down-web direction to an angular tolerance of ±10 degrees over the mesh length; in some embodiments the tolerance is less. In some embodiments, the net variation from parallel of the linear strands is small over long runs, such that individual linear strands run for very long lengths within the mesh.

In some embodiments, the net variation from parallel of the linear strands is cumulatively positive or negative, such that individual linear strands initiate at one edge of the mesh and terminate at the other edge over a given length of mesh, typically at least 3 meters, more typically at least 4 meters, more typically at least 6 meters, more typically at least 8 meters, and more typically at least 12 meters. Thus, in some embodiments, the linear strands are parallel to the down-web direction to a net tolerance of 10 degrees of angle, being the departure from parallel summed over the entire mesh length; in some embodiments the tolerance is less.

Further aspects of exemplary unitary expanded metal mesh materials are described in co-pending PCT Publ. No. PCT/US2017/091365 (Hebert).

Carrier Layers

The protection films disclosed herein include one or more carrier layers that are electrically conductive. To provide electrical conductivity, the carrier layers disclosed herein can contain a plurality of conductive fibers. In some embodiments, the conductive fibers are homogenously comprised of an electrically conductive material. In alternative embodiments, the conductive fibers are comprised of a conductive outer layer disposed on a non-conductive fibrous material.

Fiber choices include but are not limited to fiberglass, carbon, nylon and/or polyester. If made from a non-conductive material, these fibers may metallized by being coated in nickel, copper, zinc, bronze, tin or a combination thereof. The inclusion of conductive wires, such as copper, aluminum or silver, can also increase tensile strength and rigidity of the overall film.

The aforementioned metals may be deposited onto the outer surfaces of fibers using any known method, including but not limited to vacuum deposition, ion plating, electroplating, and electroless plating. For example, one useful method of rendering non-conductive fibrous substrates conductive is electroless nickel plating, where the nickel ions are reduced to metallic nickel on catalyzed surfaces without the need to apply an electric current to the substrate.

The coated carrier layer can have a basis weight of at least 1 gram per square meter (gsm), at least 2 gsm, at least 2.5 gsm, at least 3 gsm, or at least 4 gsm. The carrier layer can have a basis weight of up to 30 gsm, up to 25 gsm, up to 20 gsm, up to 15 gsm, or up to 12 gsm.

The fibrous materials used to form the electrically conductive fibers generally fall into one of two categories, woven and nonwoven materials.

Woven materials, such as scrims, are textile materials constructed from interlaced threads or strips of material that collectively form an integral fabric. Alternatively, the scrim may be constructed of a net of fibers that are bonded by adhesive or mutually melted together at intersecting points.

One particular type of scrim known as a greige cloth, which is defined as a light to medium weight, loom state, woven fabric without any additional finishing. Greige cloth is sometimes known as gauze, cloth, or scrim.

Another type of scrim utilized is an extrusion formed plastic netting in which a net of fibers is bonded at its intersecting points via melt processing. One example is the process of extrusion and orientation to produce netting based on a variety of resins, such as polyethylene, polypropylene, ethylene vinyl acetate, and others. An example is a composite plastic netting comprising polyethylene and ethylene vinyl acetate available from Conwed Plastics, Inc., Minneapolis, Minn. Generally, any woven or nonwoven scrim known in the art can be utilized for the protection films of the present disclosure. An exemplary woven carrier layer for the present disclosure is a scrim comprising woven fibers, for example, unfinished greige cloth. Alternative exemplary scrim materials are comprised of woven polyester or polyester blend fibers.

As a further alternative, extruded plastic netting materials can be employed for the scrim. Such netting can be produced by extrusion of individual plastic strands into an interconnecting network to provide net-like structures by using either a rotary or reciprocating extrusion process. Methods describing processes to produce plastic netting are given in U.S. Pat. No. 3,700,521 (Larsen); U.S. Pat. No. 3,767,353 (Gaffney); U.S. Pat. No. 3,723,218 (Gaffney); and U.S. Pat. No. 4,123,491 (Gaffney).

Some embodiments of the present disclosure comprise a scrim material having a thread count with less than 100 threads in the warp or machine direction for every 30 threads in the fill or cross direction, in some other embodiments less than 50 threads in the warp direction for every 30 threads in the fill direction, and in yet further embodiments less than 30 threads in the warp direction for every 15 threads in the fill direction.

As one of ordinary skill in the art will appreciate, the thread count and fiber denier can be selected such that a proper balance between reinforcement, tackiness and adhesiveness is met.

Nonwovens, unlike wovens, are fabric-like materials made from long fibers bonded together by chemical, mechanical, heat or solvent treatment. The nonwoven material can be chosen to achieve a particular fiber surface area, inter-fiber bonding to prevent linting (or undesirable release of fibers), fiber chemical composition, color, denier, or fiber basis weight.

By way of background, a nonwoven sheet derives its strength from chemical bonding or physical bonding (e.g. mechanical bonding) of its composite fibers. In the former process, the fibers may be coated with an adhesive resin which is cured or solidified to form bonds within the web. In the latter process, the fibers may be melt blown, in which blown fibers bond to each other by mutual melting at a sufficiently high temperature.

Mechanical bonding entangles fibers to confer strength to the web, commonly by needle punching or spun lacing. In the latter method, jets of high-pressure water are directed at an incoming dry-laid web of non-bonded fibers. The jet action serves to highly entangle the web's fibers and yields a nonwoven of high strength. This process is described, for example, in U.S. Pat. No. 3,403,862 (Dworjanyn) and U.S. Pat. No. 3,485,706 (Evans).

In one embodiment of the present disclosure, the nonwoven material comprises spun laced fibers selected from the group comprising polyester fibers, rayon fibers, polyolefin fibers (e.g. polypropylene and blend fibers), cotton fibers, and equivalents and blends thereof. In one more specific embodiment of the present disclosure, the nonwoven material comprises spun laced polyester fibers.

Nonwoven materials are typically described in terms of material basis weight, that is, the weight of a defined unit area of material. Some embodiments of the present disclosure comprise nonwoven materials within the ranges of basis weights disclosed above.

Non-metallic conductive carrier layers are also possible. For example, one or both carrier layers may be made from a mat of carbon nanotubes. Alternatively, one or both carrier layers may include continuous fibers that run parallel to each other across the plane of the protection film, where each continuous fiber is electrically isolated from every other fiber.

As shown in FIG. 5, it is also possible to use a carrier layer made from a thermoplastic polymer. Thermoplastic polymers can include, but are not limited to, polyvinylidene fluoride, tetrafluoroethylene hexafluoropropylene vinylidene fluoride, hexafluoropropylene tetrafluoroethylene ethylene fluoroelastomer, polyurethane, polyether ether ketone and any number of combinations thereof. If desired, carrier layers made from thermoplastic polymers may be blended with a sufficient amount of an electrically conductive heterogeneous filler (such as described below with respect to hardenable compositions) to provide the carrier layer with electrical conductivity along transverse directions, the z-axis direction, or both.

It is preferable that the carrier layer, or carrier layers, display electrical conductivity along the z-axis direction relative to the protection film. It was discovered that z-axis conductivity alleviates a problem observed with respect to conventional surface protection films-electrical arcing internal to the protection film. Even when electrical conductivity exists in the plane of the protection film, arcing tends to occur when there is an insulating layer between neighboring conductors. This arcing can cause damage over a widespread area around the lightning strike attachment point and cause additional damage, which can penetrate into the surfacing film. The disclosed protection films tended to reduce arcing, prevent penetration, and localize damage to the surfacing film, particularly in areas remote from the lightning strike attachment point.

Hardenable Compositions

Useful hardenable compositions include curable thermoset compositions. As used herein, a "curable thermoset composition" refers to a chemical compound capable of undergoing a crosslinking reaction. The inclusion of a suitable initiator and/or catalyst in the curable thermoset composition can enable the composition to be crosslinked upon, for example, heating or irradiation with actinic radiation (e.g., visible or ultraviolet light).

Any suitable curable thermoset composition may be used. Examples include, but are not limited to, epoxies, epoxy curing agents, phenolics, phenols, cyanate esters, polyimides (e.g., bismaleimide and polyetherimides), polyesters, benzoxazines, polybenzoxazines, polybenzoxazones, polybenzimidazoles, polybenzothiazoles, polyamides, polyamidimides, polysulphones, polyether sulphones, polycarbonates, polyethylene terephthalates, cyanates, cyanate esters; and polyether ketones (e.g., polyether ketone, polyether ether ketone, polyether ketone ketone and the like), combinations thereof, and precursors thereof.

The curable thermoset resins may contain one or more heterogenous fillers. The type of filler used is not particularly restricted and may, for example, take the form of spheres, flakes, rods, or filaments (e.g. fibers). Useful fillers include, but are not limited to, silica particles, glass particles, ceramic particles, carbon nanotubes, and combinations thereof.

Optionally, the fillers are conductive fillers. Conductivity may be based on the filler material itself being conductive (e.g. carbon) or based on the filler being at least partially coated with a conductive surface layer. Metal layers are useful for imparting electrical conductivity; suitable metal layers may include silver, copper, nickel, tin, aluminum, along with alloys and combinations thereof.

The heterogeneous filler can be present in any suitable amount to provide a given viscosity, handling, and/or conductivity profile. In non-limiting embodiments, the filler is present in an amount of at least 8 percent, at least 13 percent, at least 18 percent, at least 23 percent, or at least 27 percent, based on the overall weight of the hardenable composition. The filler can present in an amount of up to 55 percent, up to 53 percent, up to 50 percent, up to 48 percent, or up to 45 percent, based on the overall weight of the hardenable composition.

Optionally, the exposed major surface one or both of the first and second carrier layers includes a microstructured adhesive surface. In preferred embodiments, the microstructured surface defines a plurality of channels that extend across the adhesive surface. These channels either terminate at the peripheral portion of the protection film or communicate with other channels that terminate at a peripheral portion of the protection film. When the protection film is applied onto a given substrate, the pathways provide egress for air or any other fluid trapped at the interface between the adhesive and the substrate to a periphery of the protection film.

The channels can be created by embossing or forming a microstructured surface into the adhesive. The microstructured surface may be provided, for example, by a random array or regular pattern of discrete three-dimensional structures. Individual structures can at least partially define a portion of a channel in a major surface of the protection film, where a plurality of structures combine to create the continuous channels on the major surface. Selected patterns could include rectilinear patterns and other known regular patterns.

The use of a release liner is a preferred method for forming the microstructured adhesive of the present invention. The composition of the release liner is not particularly restricted. Preferred release liner compositions include, but are not limited to, plastics such as polyethylene, polypropylene, polyesters, cellulose acetate, polyvinylchloride, and polyvinylidene fluoride, as well as paper or other substrates coated or laminated with such plastics. Embossable coated papers or thermoplastic films can be siliconized or otherwise treated to impart improved release characteristics. Techniques for providing these structures on the release liner are disclosed in U.S. Pat. No. 5,650,215 (Mazurek).

Patterned Electrical Conductors

Optionally, the protection film may comprise a surface that presents discrete sites which are preferentially conductive.

In one embodiment, exterior coatings may be loaded with conductive components to establish islands of preferentially conductive regions. Exemplary conductive components include flakes, spheres, rods or filaments. These materials may be metallic or non-metallic, normally conductive or variably conductive.

In another embodiment, a structured conductive surface can be used to create discrete sites which are preferentially conductive. The surface material can be made to have a pattern that presents these discrete sites. This textured surface may be created in-situ, molded into the part, applied as a film-like product, milled, etched or by any means to affect a texture. This surface material must be conductive, contain a conductive element or be coated with a conductive material. The surface can subsequently be covered with a non-conductive material, such as a resin or paint, to the degree necessary to present discrete conductive sites on which the surface texture stands proud.

Options and advantages associated with this approach are disclosed, for example, in U.S. Pat. No. 8,922,970 (Hebert).

While not intended to be exhaustive, additional non-limiting embodiments are enumerated as follows:

1. A protection film comprising a plurality of layers, in the following order: a first carrier layer comprising a plurality of electrically conductive fibers; a metal layer; and a second carrier layer comprising a plurality of electrically conductive fibers, wherein each of the first and second carrier layers has a void volume at least partially filled with a hardenable composition.
2. The protection film of embodiment 1, further comprising: a third carrier layer comprising a plurality of fibers; and a fourth carrier layer comprising a plurality of fibers, wherein the first carrier layer, metal layer, and second carrier layer are collectively interposed between the third and fourth carrier layers and each of the third and fourth carrier layers has a void volume at least partially filled with a hardenable composition.
3. A protection film comprising a plurality of layers, in the following order: a first metal layer; a carrier layer; and a second metal layer, wherein the carrier layer is at least partially filled with a hardenable composition.
4. The protection film of any one of embodiments 1-3, wherein each carrier layer has up to 90 percent of its void volume filled with the hardenable composition.
5. The protection film of embodiment 4, wherein each carrier layer has up to 80 percent of its void volume filled with the hardenable composition.
6. The protection film of embodiment 5, wherein each carrier layer has up to 70 percent of its void volume filled with the hardenable composition.
7. The protection film of any one of embodiments 1-6, wherein each metal layer comprises a metal foil.
8. The protection film of embodiment 7, wherein the metal foil comprises copper, aluminum, or an alloy thereof.
9. The protection film of embodiment 7 or 8, wherein the metal foil comprises a foraminous metal foil.
10. The protection film of embodiment 9, wherein the foraminous metal foil comprises expanded metal foil.
11. The protection film of embodiment 9 or 10, wherein the foraminous metal foil has a thickness of from 8 micrometers to 100 micrometers.
12. The protection film of embodiment 11, wherein the foraminous metal foil has a thickness of from 9 micrometers to 60 micrometers.
13. The protection film of embodiment 12, wherein the foraminous metal foil has a thickness of from 10 micrometers to 45 micrometers.
14. The protection film of any one of embodiments 1-13, wherein each metal layer has a void volume that is at least partially filled with a hardenable composition.
15. The protection film of embodiment 7 or 8, wherein the metal foil comprises non-foraminous metal foil.
16. The protection film of embodiment 14, wherein the non-foraminous metal foil has a thickness of from 2 micrometers to 50 micrometers.
17. The protection film of embodiment 15, wherein the non-foraminous metal foil has a thickness of from 3 micrometers to 30 micrometers.
18. The protection film of embodiment 16, wherein the non-foraminous metal foil has a thickness of from 5 micrometers to 12 micrometers.
19. The protection film of any one of embodiments 1-17, wherein one or more carrier layers comprise a woven material, nonwoven material, or plurality of continuous fibers.
20. The protection film of embodiment 2, wherein the first and second carrier layers comprise a woven material and the third and fourth carrier layers comprise a nonwoven material.
21. The protection film of any one of embodiments 1-20, wherein at least one carrier layer comprises a glass, carbon, nylon, or polyester fiber that is metal-coated.
22. The protection film of any one of embodiments 1-21, wherein one or more carrier layers comprise a glass, carbon, nylon, or polyester fiber that is metal-coated.
23. The protection film of embodiment 21-22, wherein the glass, carbon, nylon, or polyester fiber is coated with silver, copper, nickel, tin, or an alloy or combination thereof.
24. The protection film of any one of embodiments 1-23, wherein each carrier layer has a basis weight of from 1 gsm to 30 gsm.

25. The protection film of embodiment 24, wherein each carrier layer has a basis weight of from 2.5 gsm to 20 gsm.
26. The protection film of embodiment 25, wherein each carrier layer has a basis weight of from 4 gsm to 12 gsm.
27. The protection film of any one of embodiments 1-26, wherein each hardenable composition comprises an epoxy resin.
28. The protection film of any one of embodiments 1-27, wherein each hardenable composition comprises a B-stage resin.
29. The protection film of any one of embodiments 1-28, wherein each hardenable composition comprises a curable thermoset resin and a heterogeneous filler dispersed therein.
30. The protection film of embodiment 29, wherein the heterogeneous filler is present in an amount of from 8 percent to 55 percent by weight based on the overall weight of the hardenable composition.
31. The protection film of embodiment 30, wherein the heterogeneous filler is present in an amount of from 18 percent to 48 percent by weight based on the overall weight of the hardenable composition.
32. The protection film of embodiment 31, wherein the heterogeneous filler is present in an amount of from 27 percent to 45 percent by weight based on the overall weight of the hardenable composition.
33. The protection film of any one of embodiments 29-32, wherein the heterogeneous filler comprises silica particles, glass particles, ceramic particles, carbon nanotubes, or a combination thereof.
34. The protection film of any one of embodiments 29-33, wherein at least some of the heterogeneous filler is metal coated.
35. The protection film of embodiment 34, wherein the heterogeneous filler is metal coated with silver, copper, nickel, tin, aluminum, or an alloy or combination thereof.
36. The protection film of any one of embodiments 1-35, wherein one or more of the carrier and metal layers are at least partially filled with a thermoplastic polymer.
37. The protection film of embodiment 36, wherein the thermoplastic polymer is selected from polyvinylidene fluoride, tetrafluoroethylene hexafluoropropylene vinylidene fluoride, hexafluoropropylene tetrafluoroethylene ethylene fluoroelastomer, polyurethane, polyether ether ketone or a combination thereof.
38. The protection film of any one of embodiments 1-37, wherein the protection film displays a flexural rigidity of at least 0.002 m$^3$/m under ambient conditions.
39. The protection film of embodiment 38, wherein the protection film displays a flexural rigidity of at least 0.003 m$^3$/m under ambient conditions.
40. The protection film of embodiment 39, wherein the protection film displays a flexural rigidity of at least 0.004 m$^3$/m under ambient conditions.
41. The protection film of any one of embodiments 1-40, wherein the protection film displays electrical conductivity along a direction perpendicular to a major surface of the protection film.
42. A prepreg article comprising the protection film of any one of embodiments 1-41 disposed on a carbon fiber composite or glass fiber composite prior to bonding or curing.
43. The prepreg article of embodiment 42, wherein two or more layers of the protection film are disposed one upon the other, in any orientation or direction, fully covering or partially covering, a carbon fiber composite or glass fiber composite prior to bonding or curing.
44. The prepreg article of embodiment 42 or 43, wherein the protection film is disposed on the carbon fiber composite or glass fiber composite using an automatic tape layup or automatic fiber placement process.

EXAMPLES

Objects and advantages of this disclosure are further illustrated by the following non-limiting examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight.

Unless otherwise noted, all reagents were obtained or are available from Aldrich Chemical Co., Milwaukee, Wis., or may be synthesized by known methods.

The following abbreviations are used to describe the examples:
° F.: Degrees Fahrenheit
° C.: Degrees Centigrade
cm: centimeters
gsm: grams per square centimeter
mg: milligrams
mil: 10-3 inches
μm: micrometers
mm: millimeters
mOhms/□: milliOhms per square
kPa: kilopascals
psi: pounds per square inch
rpm: revolutions per minute
vol. %: volume percent
wt. %: weight percent Materials Used:

CCGF: Conductive coated glass flakes, obtained under the trade designation "CONDUCT-O-FIL SG15F35" from Potters Industries, Valley Forge, PA.

CG-1400: Dicyandiamide, available under the trade designation "AMICURE CG-1400" from Air Products and Chemicals, Incorporated, Allentown, PA.

CNC: An 8 gsm copper-nickel-carbon nonwoven scrim, obtained under the trade designation "20444A" from Technical Fibre Products, LLC, Newburgh, NY.

DER-330: A low viscosity liquid epoxy resin is a reaction product of epichlorohydrin and bisphenol-A, obtained under the trade designation "D.E.R. 330" from Dow Chemical Company, Midland, MI.

DER-6508: An isocyanate-modified 2-functional epoxy resin, obtained under the trade designation "DER-6508" from Dow Chemical Company.

DF-1: A polymeric, non-silicone, flow additive, available under the trade designation "DYNOADD F-1" from Dynea Oy, Helsinki, Finland.

ECF: 57-175 gsm expanded copper foil, obtained under the trade designation "AEROMESH" from Benmetal GmbH, Seigen, Germany.

EPON SU-8: An epoxy novolac resin having an average epoxide group functionality of approximately eight, available under the trade designation "EPON SU-8" from Momentive Specialty Chemicals, Houston, TX.

GL-104: 104 gsm glass cloth obtained from JPS Composite Materials Corporation, Anderson, SC.

MEK: Methyl ethyl ketone.

MPK: Methyl propyl ketone.

MX-257: A 37% concentrate of core shell rubber toughening agent in liquid epoxy resin based on Bisphenol-A, obtained under the trade designation "MX-257" from Kaneka North America, LLC.

MY-9634: A tetrafunctional epoxy resin, available under the trade designation "ARALDITE MY-9634" from Huntsman Corporation, Woodlands, TX.

OPT-10: A 10 gsm glass scrim, available under the trade designation "OPTIMAT 20103A" from Technical Fibre Products, LLC.

P2353U: A unidirectional epoxy prepreg, available under the trade designation "TORAY P2353U 19 152" from Toray Industries, Inc.

PCDI: 35:60:5 parts by weight weight polycarbodiimide:MEK:cyclohexanone PG-7: A copper-phthaocyanine pigment, available under the trade designation "VYNAMON GREEN 600734" from Heucotech Ltd., Fairless Hills, PA.

RA-95: A bisphenol-A epoxy resin modified carboxyl terminated butadiene acrylonitrile elastomer, available under the trade designation "HYPOX RA-95" from CVC Specialty Chemicals Inc., Moorestown, NJ.

R-960: A rutile titanium dioxide pigment, available under the trade designation "TI-PURE R-960" from E.I. du Dupont de Nemours and Company, Wilmington, DE.

SD-3: A modified hectorite clay, available under the trade designation "BENTONE SD-3" from Elementis Specialities, Hightown, NJ.

TS-720: A treated fumed silica, available under the trade designation "CAB-O-SIL TS-720" from Cabot Corporation, Billerica, MA.

U-52: An aromatic substituted urea (4,4' Methylene bis (phenyl dimethyl urea), available under the trade designation "OMICURE U-52" from CVC Specialty Chemicals Incorporated, Moorestown, NJ.

Adhesive Compositions

Millbase

At a temperature of 70° F. (21.1° C.), 14.32 grams DER-330, 0.77 grams SD-3, 0.47 grams PG-7, 2.33 grams R-960, 4.40 grams CG-1400 and 0.23 grams U-52 were charged into plastic cup designed for use in a planetary mill, model "SPEED MIXER DA 400 FV", available from Synergy Devices Limited, Buckinghamshire, United Kingdom. The cup was placed into a planetary mixer and mixed at 2200 rpm for 2 minutes. The mixture was milled in a three-roll mill for three passes and then set aside.

At a temperature of 70° F. (21.1° C.), 21.46 grams DER-6508 and 8.41 grams EPON SU-8 were manually crushed with a pestle and mortar and charged into another plastic cup designed for use in the planetary mill. 13.29 grams MEK and 2.71 grams MPK were added to the cup, which was then secured to the mill and rotated at 2,200 rpm until the mixture was dissolved—approximately 15 minutes.

Adhesive Composition 1 (AC-1)

12.99 grams MX-257, 3.05 grams MY-9634, 0.67 grams DF-1, 4.328 grams RA-95, 1.48 grams TS-720, 16.06 grams of the millbase, 0.6 grams DF-1 and 5.7 grams PCDI were added to the cup. The mixture was returned to the planetary mixer, and the mixing continued for another 1 minute at 2,000 rpm. The mixture was manually scraped and returned to the planetary mill until all components were homogeneously dispersed, approximately 1 minute.

Adhesive Composition 2 (AC-2)

To 50 grams of AC-1 was added 32.0 grams CCGF and 11.4 grams MEK. The mixture was returned to the planetary mixer, and the mixing continued for another 1 minute at 2,000 rpm. The mixture was manually scraped and returned to the planetary mill until all components were homogeneously dispersed, approximately 1 minute. The concentration of conductive coated glass flake was 38 pigment vol. %.

Adhesive Composition 3 (AC-3)

The procedure for preparing AC-2 was repeated, wherein the amounts of CCGF and MEK were increased to 39.0 and 13.0 grams, respectively. The concentration of conductive coated glass flake was 43 pigment vol. %.

Adhesive Composition 4 (AC-4)

The procedure for preparing AC-2 was repeated, wherein the amounts of CCGF and MEK were increased to 39.0 and 13.0 grams, respectively. The concentration of conductive coated glass flake was 48 pigment vol. %.

The adhesive compositions were subsequently notch bar coated, at approximately 16 by 16 inch (30.48 by 30.48 cm) and varying coating weights, onto a bleached silicone coated release liner, type "23210 76 #BL KFT H/HP 4D/6 MH", obtained from Loparex, Inc., Iowa City, Iowa, at bar gaps of between 3-8 mil (76.2-203.2 µm), corresponding to target coating weights of 48-126 gsm. The adhesive compositions were allowed to dry for at least 12 hours at approximately 70° F. (21.1° C.). With respect to AC-1, an approximately equally sized section of CNC (8 gsm copper-nickel-carbon nonwoven scrim) was laid over the dried adhesive coating. This assembly was then placed in a layup tool and a vacuum of 25 inches of mercury (84.7 kPa) applied for approximately 5 to 10 minutes.

The dried Adhesive Compositions AC-1 through AC-4 were then slit into ¼ inch (6.35 mm) strips.

Nine sheets of approximately 10 by 10 inch (40.64 by 45.72 cm) P2353U prepreg were laid on a vacuum table, orientated at 45/90/135/0/90/0/135/90/45 degrees and a vacuum of 25 inches of mercury (84.7 kPa) applied for approximately 5 to 10 minutes in order to secure the sheets.

Strips of the ¼ inch (6.35 mm) exemplary adhesive compositions were applied over the prepreg in either 50% overlapping butt splices (A2), or crossover butt splices (AX) to form a finished panel, each layup format consisting of 40 strips. The finished panel was placed in an autoclave and a vacuum of approximately 28 inches mercury (94.8 kPa) was applied to the inside of the bag for 10 to 15 minutes at 72° F. (22.2° C.), after which the external pressure was gradually increased to 55 psi (397 kPa). The vacuum inside the bag was maintained at 94.8 kPa and the temperature increased at a rate of 5° F. (2.8° C.) per minute until reaching 350° F. (176.7° C.). This temperature was held for 2 hours, after which the temperature was returned to 72° F. (22.2° C.), the pressure released and the cured composite article removed from the vacuum bag.

Comparatives A-B

The procedure generally described for preparing AC-1 was repeated, wherein the CNC scrim was replaced by OPT-10 and GL-104 glass scrims.

The various exemplary constructions of the present invention, and comparatives, are listed in Table 1, along with the corresponding conductivity values. With respect to the AX layup, conductivities were measured in the zero and 90 degree orientations.

TABLE 1

| Sample | Adhesive Layer Composition | Adhesive Layer Scrim | Conductor Thickness (μm) | Conductor Areal Weight (gsm) | Panel Layup | Conductivity <A/B> (mOhms/□) |
|---|---|---|---|---|---|---|
| Example 1 | AC-1 | CNC | 50 | 175 | AX | 1.7/3.0 |
| Example 2 | AC-3 | 43 vol. % CCGF | 50 | 175 | AX | 0.5/0.006 |
| Example 3 | AC-1 | CNC | 50 | 73 | AX | 5.1/9.4 |
| Example 4 | AC-4 | 48 vol. % CCGF | 50 | 73 | AX | 5.6/7.1 |
| Example 5 | AC-3 | 43 vol. % CCGF | 50 | 73 | AX | 0.08/0.03 |
| Example 6 | AC-2 | 38 vol. % CCGF | 50 | 73 | AX | 4.7/0.02 |
| Example 7 | AC-1 | CNC | 50 | 107 | AX | 2.7/4.5 |
| Example 8 | AC-1 | CNC | 30 | 90 | AX | 7.4/4.6 |
| Example 9 | AC-1 | CNC | 30 | 65 | AX | 6.4/9.2 |
| Example 10 | AC-1 | CNC | 30 | 57 | AX | 11.0/0.02 |
| Example 11 | AC-1 | CNC | 50 | 107 | A2 | 0.02 |
| Example 12 | AC-1 | CNC | 50 | 90 | A2 | 5.6 |
| Example 13 | AC-1 | CNC | 42 | 65 | A2 | 5.6 |
| Example 14 | AC-1 | CNC | 30 | 57 | A2 | 7.7 |
| Comparative A | AC-1 | OPT-10/GL-104 | 50 | 175 | A2 | 2.7 |
| Comparative B | AC-1 | OPT-10/GL-104 | 50 | 175 | AX | 2.6/3.6 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A protection film comprising a plurality of layers, in the following order:
   a first carrier layer comprising a plurality of metallized electrically conductive fibers and having an exposed major surface, the metallized electrically conductive fibers comprised of metallized fiberglass or metallized carbon fibers;
   a metal layer directly contacting the first carrier layer and comprising a foraminous foil having a thickness of from 10 micrometers to 45 micrometers; and
   a second carrier layer directly contacting the metal layer and having an exposed major surface, the second carrier layer comprising a plurality of metallized electrically conductive fibers comprised of metallized fiberglass or metallized carbon fibers, wherein each of the first and second carrier layers and the metal layer has a void volume at least partially filled with a hardenable composition,
   whereby the protection film displays electrical conductivity along the z-axis direction.

2. A protection film comprising a plurality of layers:
   a first carrier layer comprising a plurality of metallized electrically conductive fibers comprised of metallized fiberglass or metallized carbon fibers;
   a metal layer directly contacting the first carrier layer and comprising a foraminous foil having a thickness of from 10 micrometers to 45 micrometers; and
   a second carrier layer directly contacting the metal layer and comprising a plurality of metallized electrically conductive fibers comprised of metallized fiberglass or metallized carbon fibers,
   a third carrier layer comprising a plurality of fibers directly contacting the first carrier layer; and
   a fourth carrier layer directly contacting the second carrier layer and comprising a plurality of fibers, wherein the third and fourth carrier layers each have an exposed major surface, wherein the first carrier layer, metal layer, and second carrier layer are collectively interposed between the third and fourth carrier layers and each of the first, second, third and fourth carrier layers has a void volume at least partially filled with a hardenable composition,
   whereby the protection film displays electrical conductivity along the z-axis direction.

3. A protection film comprising a plurality of layers, in the following order:
   a first metal layer comprising a foraminous foil having a thickness of from 10 micrometers to 45 micrometers and having an exposed major surface;
   a carrier layer directly contacting the first metal layer and comprising a plurality of metallized electrically conductive fibers comprised of metallized fiberglass or metallized carbon fibers; and
   a second metal layer directly contacting the carrier layer and having an exposed major surface, the second metal layer comprising a foraminous foil having a thickness of from 10 micrometers to 45 micrometers, wherein the first and second metal layers and the carrier layer are at least partially filled with a hardenable composition,
   wherein the carrier layer displays z-axis electrical conductivity to enable z-axis electrical conductivity of the overall protection film.

4. The protection film of claim 1, wherein the foraminous metal foil comprises expanded metal foil.

5. The protection film of claim 1, wherein one or more carrier layers comprise a woven material, nonwoven material, or plurality of continuous fibers.

6. The protection film of claim 2, wherein the first and second carrier layers comprise a woven material and the third and fourth carrier layers comprise a nonwoven material.

7. The protection film of claim 1, wherein each hardenable composition comprises an epoxy resin.

8. The protection film of claim 1, wherein one or more of the carrier and metal layers are at least partially filled with a thermoplastic polymer.

9. The protection film of claim 8, wherein the thermoplastic polymer is selected from polyvinylidene fluoride, tetrafluoroethylene hexafluoropropylene vinylidene fluoride, hexafluoropropylene tetrafluoroethylene ethylene fluoroelastomer, polyurethane, polyether ether ketone or a combination thereof.

10. A prepreg article comprising the protection film of claim 1 disposed on a carbon fiber composite or glass fiber composite prior to bonding or curing.

11. The protection film of claim 1, wherein each of the first and second carrier layers has a basis weight of from 4 gsm to 12 gsm.

12. The protection film of claim 1, wherein the hardenable composition is a curable thermoset composition and further wherein the first and second carrier layers are partially exposed along a surfaces of the curable thermoset composition.

13. A method of protecting a fiber composite, the method comprising:
  providing a fiber composite comprised of a carbon fiber composite or glass fiber composite;
  applying a prepreg article comprising the protection film of claim 1 to the fiber composite using an automatic tape layup or automatic fiber placement machine; and
  curing the prepreg article.

14. A method of protecting a fiber composite, the method comprising:
  providing a fiber composite comprised of a carbon fiber composite or glass fiber composite;
  applying a prepreg article comprising the protection film of claim 2 to the fiber composite using an automatic tape layup or automatic fiber placement machine; and
  curing the prepreg article.

15. A method of protecting a fiber composite, the method comprising:
  providing a fiber composite comprised of a carbon fiber composite or glass fiber composite;
  applying a prepreg article comprising the protection film of claim 3 to the fiber composite using an automatic tape layup or automatic fiber placement machine; and
  curing the prepreg article.

* * * * *